(12) United States Patent
Fuse (10) Patent No.: US 8,097,352 B2
(45) Date of Patent: Jan. 17, 2012

(54) BATTERY SYSTEM AND BATTERY SAFETY ALARM SYSTEM

(75) Inventor: Kenichi Fuse, Hadano (JP)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 12/895,544

(22) Filed: Sep. 30, 2010

(65) Prior Publication Data

US 2011/0262786 A1    Oct. 27, 2011

(30) Foreign Application Priority Data

Apr. 27, 2010    (JP) ................... 2010-102141

(51) Int. Cl.
  *H01M 10/48*    (2006.01)
  *G01B 7/16*    (2006.01)
  *G01B 11/16*    (2006.01)
  *G01L 1/00*    (2006.01)
  *G01L 1/24*    (2006.01)

(52) U.S. Cl. .............. 429/90; 429/61; 324/426

(58) Field of Classification Search .......... 429/61, 429/90; 324/426
See application file for complete search history.

(56) References Cited

U.S. PATENT DOCUMENTS

| | | |
|---|---|---|
| 4,342,907 A | 8/1982 | Macedo et al. |
| 5,770,155 A | 6/1998 | Dunphy et al. |
| 5,949,219 A | 9/1999 | Weiss |
| 6,002,240 A * | 12/1999 | McMahan et al. ............ 320/150 |
| 6,143,440 A * | 11/2000 | Volz et al. ................. 429/92 |
| 6,380,710 B1 | 4/2002 | Watanabe et al. |
| 6,384,607 B2 | 5/2002 | Horie et al. |
| 6,531,522 B1 | 3/2003 | Winningham |
| 6,531,847 B1 | 3/2003 | Tsukamoto et al. |
| 7,545,119 B1 | 6/2009 | Egan et al. |
| 2003/0103552 A1 * | 6/2003 | Chi et al. ................. 374/137 |
| 2003/0231996 A1 * | 12/2003 | Shiu et al. ............... 423/179.5 |

FOREIGN PATENT DOCUMENTS

| | | |
|---|---|---|
| JP | 64-001934 | 1/1989 |
| JP | 01-219612 | 9/1989 |
| JP | 04-353731 | 12/1992 |
| JP | 05-272920 | 10/1993 |
| JP | 11-287626 | 10/1999 |
| JP | 2000-173676 | 6/2000 |
| JP | 2001051166 A * | 2/2001 |
| JP | 2002-289265 | 10/2002 |

OTHER PUBLICATIONS

Machine Translation of JP 2002-289265—Oct. 4, 2002.*

(Continued)

*Primary Examiner* — Robert Hodge
(74) *Attorney, Agent, or Firm* — Maschoff Gilmore & Israelsen (57) ABSTRACT

A battery system that can prevent a battery from bursting and a battery safety alarm system therefore are provided. A battery system includes an optical fiber wound around an outer circumferential portion of a battery. The battery system detects an abnormality of the battery on the basis of a loss of the laser beam caused by lateral pressure acting on the optical fiber. An alarm warns a user of the abnormality when the abnormality is detected.

26 Claims, 4 Drawing Sheets

OTHER PUBLICATIONS

Hirose, Naohiro et al., "Optical Component Coupling using Self-Written Waveguides," Integrated Optics: Devices, Materials, and Technologies VIII, edited by Yakov Sidorin, Ari Tervonen, Proceedings of Spie Vol. (SPIE, Bellingham, WA, 2004), pp. 206-214.

Yamashita, Tatsuya et al., "Light-induced Self-written Waveguides for Large Core Optical Fiber Modules," Active and Passive Optical Components for WDM Communications V, Proc. of SPIE vol. 6014, 60140M, (2005), pp. 60140M-1-60140M-8.

Related pending U.S. Application No. 13/062,516, filed Mar. 6, 2011.

Office Action dated Apr. 6, 2011 in related U.S. Appl. No. 12/895,494.

Office Action dated Dec. 17, 2010 in related U.S. Appl. No. 12/895,494.

United States Office Action dated Sep. 15, 2011 as received in related U.S. Appl. No. 12/895,494.

* cited by examiner

BATTERY SYSTEM AND BATTERY SAFETY ALARM SYSTEM

CROSS-REFERENCE TO RELATED APPLICATIONS

This application is related to U.S. patent application Ser. No. 12/895,494 filed Sep. 30, 2010 and to PCT application PCT/US2010/054735 filed in the U.S. Receiving Office Oct. 29, 2010.

This application claims priority to Japanese Patent Application No. 2010-102141 filed Apr. 27, 2010, which is incorporated herein by reference.

TECHNICAL FIELD

Embodiments relate to a battery system and a battery safety alarm system therefor.

BACKGROUND

Primary batteries such as an alkali dry battery and a nickel dry battery and secondary batteries such as a lithium ion secondary battery are used in various electronic apparatuses. In particular, the lithium ion secondary battery (hereinafter simply referred to as "lithium ion battery") is used as a power source for a portable information terminal apparatus such as a cellular phone. The lithium ion battery is light in weight and can be used for a long period because a relatively large amount of energy can be stored therein Further, the lithium ion battery has high energy density, has excellent self-discharge properties (energy retention properties), and has substantially no problem of inter-electrode short-circuit due to deposition of dendrite substances. Therefore, the lithium ion battery can be used as a power supply not only for the terminal apparatus but also for a hybrid automobile and the like. It is also expected that the lithium ion battery will be mounted on an electric automobile now under development.

In general, various batteries including the lithium ion battery have high sealing properties. In some cases, an internal battery pressure abnormally rises because of overcharge, charge due to reverse mounting, or the like. As precautions for such a case, to prevent the batteries from bursting, safety valves for discharging gas as a cause of an internal pressure rise to the outside of the batteries are usually provided in the batteries.

However, when the safety valves do not operate normally, the batteries are likely to burst. In particular, for example, a bursting lithium ion battery expected to be mounted on an automobile could be a cause of fire. Therefore, for practical use, it is necessary to take all possible protection measures for preventing the batteries from bursting.

SUMMARY

According to aspects of the embodiments described herein systems, a battery system that can prevent a battery from bursting and a battery safety alarm system therefore are provided.

A battery system according to the present disclosure includes: a battery; a light source that emits light; an optical fiber is provided that is in contact with an outer surface portion of the battery and via which the light emitted from the light source is transmitted; a housing that houses the battery and a region of the optical fiber that is in contact with the outer surface portion of the battery; and a detector that receives the light transmitted via the optical fiber and detects abnormality of the battery on the basis of transmission properties of the optical fiber.

In the configuration of the battery system, when an external shape of the battery expands according to a rise in an internal pressure of the battery, a lateral pressure acts on the optical fiber that is in contact with the outer surface portion of the battery. The lateral pressure is pressure acting on a side of a fiber. When the lateral pressure acts on the optical fiber, the optical fiber is pushed to an outer side but is restrained by the housing arranged on the outer side. As a result, since pressure acts on the optical fiber from an inner side and from the outer side, a large lateral pressure acts on the optical fiber. When the lateral pressure acts on the optical fiber, a part of a light signal tends to leak from a transmission line of the optical fiber and the transmission properties are deteriorated. Therefore, by measuring a change in the transmission properties (i.e., a transmission loss) of the optical fiber, it is possible to detect an abnormality of the battery with the detector for the light signal based on a result of the measurement. When abnormality of the battery is detected by the detector in this way, it is possible to prevent the battery from bursting by stopping use of the battery. In the present disclosure, since the housing is provided, the lateral pressure acting on the optical fiber can be increased compared with lateral pressure that would act on the optical fiber when the housing is not provided. Therefore, it is possible to further improve sensitivity to a change in the external shape of the battery.

For example, the battery system further includes an alarm that warns, when abnormality of the battery is detected by the detector, a user of the abnormality. Since the user is warned of the abnormality by the alarm, it is possible to promptly inform the user of the abnormality of the battery. "Warn" includes all acts of outputting, communicating, transmitting, and sending an abnormality detection signal by the detector. One of the detector and the alarm may also serve as the other. The detector and the alarm may be separately provided or may be integrally provided.

For example, the housing is arranged in contact with the optical fiber. Consequently, when the optical fiber is pushed from the inner side to the outer side by expansion of the battery, pressure acts from an inner wall of the housing on the optical fiber. However, a predetermined clearance may be provided between the optical fiber and the housing.

For example, the detector detects abnormality of the battery on the basis of a loss of light (an absolute value of a transmission loss) due to changes in the transmission characteristics of the optical fiber. Alternatively, the detector detects abnormality of the battery on the basis of a change with time in the loss of light due to the optical fiber.

For example, the battery may be a lithium ion battery. For example, the lithium ion battery includes an organic electrolytic solution as an electrolyte. Since the organic electrolytic solution used in the lithium ion battery tends to have high volatility, it is possible that, when the battery is heated from overcharging or the like, pressure in the battery rises and the battery easily bursts. Therefore, the present disclosure can effectively prevent, in particular, the lithium ion battery from bursting.

A mode of the optical fiber is not specifically limited. Examples of the optical fiber include a single mode optical fiber. Examples of the light source include a light source that emits a laser beam (a type of a laser is not specifically limited either and may be, for example, a semiconductor laser). The single mode optical fiber tends to have large characteristic deterioration due to the act of lateral pressure compared with a multi mode optical fiber. Specifically, a loss of transmitted light increases with respect to the same change in the external shape of the battery and abnormality in the external shape of the battery is easily detected by the detector. This makes it possible to further improve the sensitivity to a change in the external shape of the battery.

For example, the battery may have a cylindrical (circular cylindrical or angular cylindrical) external shape. For example, the optical fiber is wound around the outer surface portion of the battery. Consequently, even when the outer surface portion of the battery changes locally, the lateral pressure acts on the optical fiber. Therefore, it is possible to detect abnormality in the external shape of the battery more effectively or with higher sensitivity compared with detection performed when the optical fiber is not wound around the outer surface portion of the battery. Since an area of the optical fiber on which the lateral pressure of the battery acts increases, a change in the transmission properties of light with respect to the lateral pressure increases and it is possible to more effectively and more surely detect abnormality in the external shape of the battery. For example, since the optical fiber is wound around the outer surface portion of the battery in a plurality of lines, it is possible to improve the sensitivity to abnormality in the external shape of the battery.

Embodiments can be implemented in the battery systems in an automobile, a cellular phone, a personal computer, a game machine, and personal digital electronics. This makes it possible to provide an automobile, a cellular phone, a personal computer, a game machine, and personal digital electronics with protection measures that can prevent the battery from bursting.

A battery safety alarm system according to the present disclosure includes: a light source that emits light; an optical fiber is provided that is in contact with an outer surface portion of a battery and via which the light emitted from the light source is transmitted; a housing that houses the battery and a region of the optical fiber that is in contact with the outer surface portion of the battery; and a detector alarm that receives the light transmitted via the optical fiber detects abnormality of the battery on the basis of transmission properties of the optical fiber, and warns, when abnormality of the battery is detected, a user of the abnormality.

A battery system according to the present disclosure includes: a lithium ion battery formed in a cylindrical shape and including an organic electrolytic solution as an electrolyte; a laser beam source that emits a laser beam; a single mode optical fiber that is wound around an outer circumferential portion of the lithium ion battery in a plurality of lines and via which the laser beam emitted from the light source is transmitted; a housing that houses the lithium ion battery and a region of the optical fiber that is in contact with an outer surface portion of the lithium ion battery and is arranged in contact with the optical fiber; a detector that receives the laser beam transmitted via the optical fiber and detects abnormality of the lithium ion battery based on a loss of the laser beam due to changes in the optical fiber or a change in the laser beam transmitted via the optical fiber over time; and an alarm that warns, when abnormality of the lithium ion battery is detected by the detector, a user of the abnormality.

In the configuration of the battery system, when external shape of the lithium ion battery expands according to a rise in an internal battery pressure, lateral pressure acts on the single mode optical fiber that is in contact with the outer circumferential portion of the lithium ion battery. When the lateral pressure acts on the optical fiber, the optical fiber is pushed towards an outer side but is restrained by the housing arranged on the outer side. As a result, since pressure acts on the optical fiber from the inner side by the expanding lithium ion battery and from the outer side by the housing, a large lateral pressure acts on the optical fiber. When the lateral pressure acts on the optical fiber, a part of a light signal tends to leak from a transmission line or from the optical fiber, transmission properties of the optical fiber are deteriorated, and the loss of the laser beam due to the deterioration of the transmission properties of the optical fiber increases. Abnormality of the lithium ion battery is detected by the detector for the light signal on the basis of the loss of the laser beam due to the optical fiber or a change in the loss over time or more specifically due to changes in the transmission characteristics of the optical fiber. The user is warned of the abnormality of the lithium ion battery by the alarm. When the user is warned of the abnormality of the lithium ion battery, it is possible to prevent the lithium ion battery from bursting by performing processing or operation for, for example, stopping use of the lithium ion battery. In the present disclosure, since the housing is provided, the lateral pressure acting on the optical fiber can be increased compared with lateral pressure that would act on the optical fiber when the housing is not provided. Therefore, it is possible to further improve sensitivity to a change in the external shape of the battery.

DETAILED DESCRIPTION

An embodiment of the present disclosure is explained below with reference to the accompanying drawings. In the drawings, the same components are denoted by the same reference numerals and redundant explanation of the components is omitted. A positional relation of up and down and left and right is based on a positional relation shown in the drawings unless specifically noted otherwise. A dimensional ratio of the drawings is not limited to a ratio shown in the drawings. The embodiment is an illustration for explaining the present disclosure and is not meant to limit the present disclosure to only the embodiment. Further, various modifications of the present disclosure are possible without departing from the spirit of the present disclosure.

Figure 1:
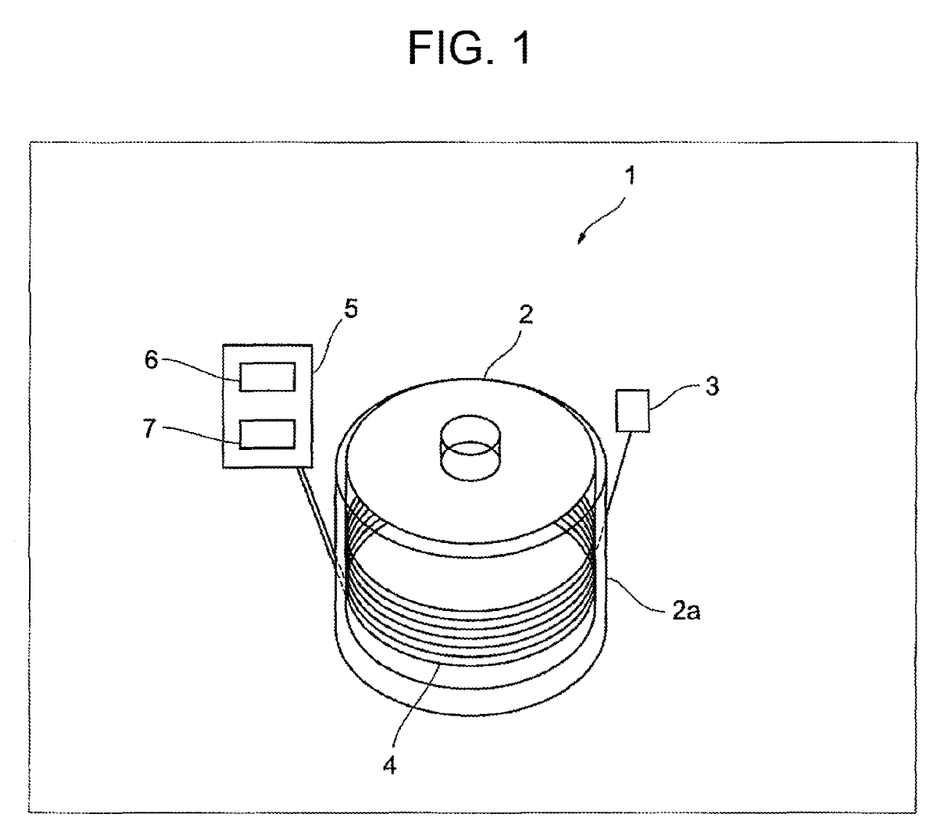
FIG. 1 is a diagram showing a configuration of a battery system according to an embodiment.
Figure 2:
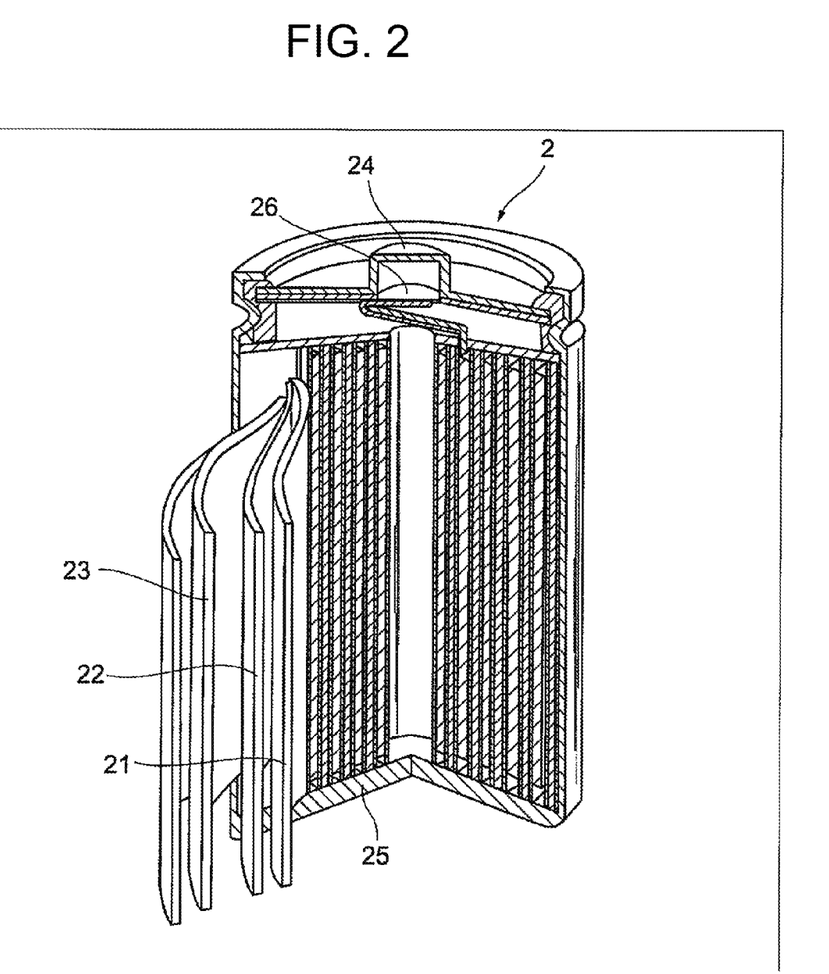
FIG. 2 is a diagram showing a configuration of a lithium ion battery as an example of a battery used in the battery system.

FIG. 1 is a diagram showing a configuration of a battery system according to an embodiment. FIG. 2 is a diagram showing a configuration of a lithium ion battery used in the battery system. A battery system 1 according to this embodiment includes a lithium ion battery 2, a housing 2a, a light source 3, an optical fiber 4, and a detector alarm 5 (serving as both a detector and an alarm).

As shown in FIG. 2, the lithium ion battery 2 is packaged in, for example, a cylindrical shape. In the lithium ion battery 2, a large number of sheet-like anodes (positive electrodes) 21, separators 22, and cathodes (negative electrodes) 23 are wound to be superimposed one on top of another around a core section. The anodes 21, the separators 22, and the cathodes 23 are immersed in an electrolytic solution serving as an electrolyte.

The anodes 21 may contain a metallic oxide to which lithium ions can be inserted and from which the lithium ions can be detached. A material of the anodes 21 is not specifically limited. The anodes 21 may be formed of, for example, lithium cobalt composite oxide ($LiCoO_2$), lithium nickel composite oxide ($LiNiO_2$), lithium manganese composite oxide ($LiMn_2O_2$), or lithium iron composite oxide ($LiFeO_2$).

The separators 22 are provided to retain the electrolytic solution between the anodes 21 and the cathodes 23 and prevent the anodes 21 and the cathodes 23 from coming into contact with each other. A material of the separators 22 is not specifically limited as long as the lithium ions can pass through the material and the material can retain the electrolytic solution. The separators 22 may be formed of, for example, porous plastic.

The electrolytic solution impregnated in the separators 22 is, for example, an organic electrolytic solution containing an organic solvent such as ethylene carbonate or diethyl carbonate and a solute of lithium salt. The organic electrolytic solution has volatility and is likely to raise pressure in the battery when the organic electrolytic solution is heated by overcharging, overcharging or the like.

The cathodes 23 contain a material to which the lithium ions can be inserted and from which the lithium ions can be detached. A material of the cathodes 23 is not limited. The cathodes 23 may be formed of, for example, a carbon material such as graphite.

An anode terminal 24 is electrically connected to the anodes 21 and may be formed of, for example, aluminum. A cathode terminal 25 is electrically connected to the cathodes 23 and may be formed of, for example, nickel.

A principle of charge and discharge of the lithium ion battery is explained. In the case of the discharge, lithium contained in the cathodes 23 is ionized in the electrolytic solution. The ionized lithium in the electrolytic solution passes through the separators 22 to reach the anodes 21. Electrons are released according to the ionization of lithium, whereby the electrons change to electric current flowing in an external circuit. In the case of charging the battery 2, when voltage is applied to the anode terminal 24 and the cathode terminal 25 from the outside, the lithium ions present in the anodes 21 pass through the separators 22 to return to the cathodes 23 to reverse the discharge. A chemical reaction caused by repetition of the discharge and the charge is a basic principle for the lithium ion battery 2 to function as a secondary battery.

When the lithium ion battery 2 is overcharged, the lithium ion battery 2 is heated. As a result, it is likely that the organic electrolytic solution volatilizes, the pressure in the battery rises, and a battery package expands. A rise in the pressure in the battery also occurs when impurities are mixed in main components of the battery such as the anodes and the cathodes by mistake. In the lithium ion battery 2 shown in FIG. 2, a safety valve 26 is provided to prevent such a rise in the pressure in the battery. When the internal battery pressure exceeds a predetermined threshold, the safety valve 26 opens to allow gas in the battery to escape to the outside.

In the battery system 1, according to one embodiment, the housing 2a, the light source 3, the optical fiber 4, and the detector alarm 5 are provided as shown in FIG. 1 as a system for monitoring a change in an external shape of the lithium ion battery 2 and preventing the lithium ion battery 2 from bursting even when the safety valve 26 does not normally operate or the safety valve 26 is not provided.

The housing 2a is arranged to house the lithium ion battery 2 and a region of the optical fiber 4 that is in contact with an outer surface portion of the lithium ion battery 2. Therefore, the housing 2a is arranged to surround at least a side portion of the lithium ion battery 2. Hole portions for permitting the optical fiber 4 to pass are provided in a predetermined place of the housing 2a. The housing 2a may be arranged a predetermined space away from the outer surface portion of the lithium ion battery 2. For example, when the space is set to be equal to a diameter of the optical fiber 4, the optical fiber 4 is arranged in contact with both the lithium ion battery 2 and the housing 2a. Alternatively, when the space is set to be larger than the diameter of the optical fiber 4, the optical fiber 4 is arranged with a predetermined clearance between the optical fiber 4 and the housing 2a. A material of the housing 2a is not limited. When the housing 2a surrounds even a bottom of the lithium ion battery 2 and is used as an electrode, the housing 2a is formed of, for example, a metal material. In this case, as the material of the housing 2a, nickel, which is the same material as the cathode terminal 25 of the lithium ion battery 2 can be used.

The light source 3 is coupled to one end of the optical fiber 4 and emits light to the optical fiber 4. The light source 3 emits, for example, a laser beam. Wavelength of the laser beam may be appropriately selected according to an environment of use and an application. For example, wavelength of 1.31 μm or 1.55 μm may be used. A type of a laser beam source is not specifically limited either. For example, a semiconductor laser may be used as the laser beam source.

The optical fiber 4 is provided to be closely attached to the outer surface portion of the lithium ion battery 2. One end of the optical fiber 4 is optically coupled to the light source 3 and the other end thereof is optically coupled to the detector alarm 5. The optical fiber 4 is arranged between the outer surface portion of the lithium ion battery 2 and a housing 2a. For example, the optical fiber 4 is arranged in contact with both the outer surface portion of the lithium ion battery 2 and the inner surface portion of the housing 2a.

Figure 3:
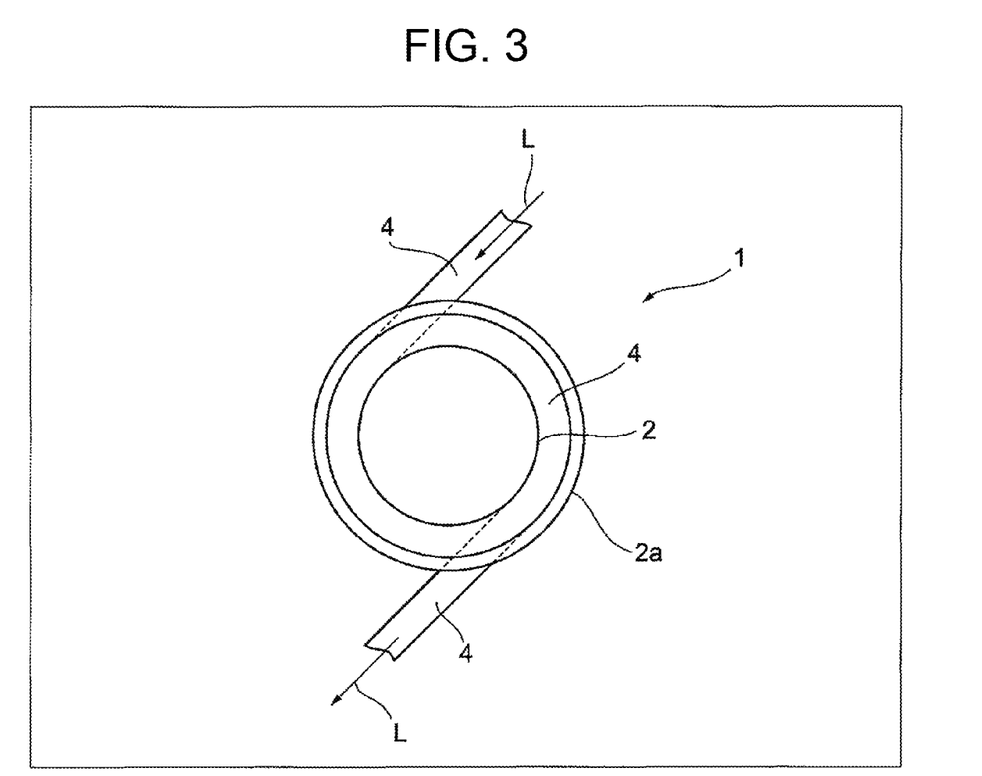
FIG. 3 is a diagram showing lateral pressure acting on an optical fiber.

FIG. 3 is a diagram showing lateral pressure acting on the optical fiber 4 viewed from an upper surface of the lithium ion battery 2. As shown in FIG. 3, when an external shape of the battery increases or changes according to a rise in the pressure in the lithium ion battery 2, a tensile force acts on an outer surface of the optical fiber 4 and exerts a lateral pressure on the optical fiber 4. As a result, the lateral pressure acts on the optical fiber 4. When the lateral pressure acts on the optical fiber 4, the optical fiber 4 is pushed to an outer side but is restrained by the housing 2a arranged on the outer side. As a result, pressure acts on the optical fiber 4 from the inner side and from the outer side, resulting in a large lateral pressure on the optical fiber 4. When the lateral pressure acts on the optical fiber 4, a part of a light signal from a transmission line of the optical fiber 4 tends to leak. As a result, transmission properties of the optical fiber 4 are deteriorated and a loss of a laser beam L due to the deterioration of the transmission properties of the optical fiber 4 increases. The loss is detected by the detector alarm 5. Thus, abnormality in the external shape, such as changes resulting from an increasing internal battery pressure, of the lithium ion battery 2 can be detected. Therefore, the optical fiber 4 only has to be in contact with an outer circumferential portion of the lithium ion battery 2 and may be wound around the outer circumferential portion of the lithium ion battery 2 by only one line.

By winding the optical fiber 4 around the outer circumferential portion of the lithium ion battery 2 as shown in FIG. 1, even when a part of the outer circumferential portion of the lithium ion battery 2 changes, lateral pressure acts on the optical fiber 4. It is possible to monitor a change in an entire side of the lithium ion battery 2. By winding the optical fiber 4 around the outer circumference of the lithium ion battery 2 in a plurality of lines, it is possible to increase a contact area between the outer circumferential portion of the lithium ion battery 2 and the optical fiber 4. It is possible to increase a change in the transmission properties of the optical fiber 4 with respect to the lateral pressure.

Figure 4:
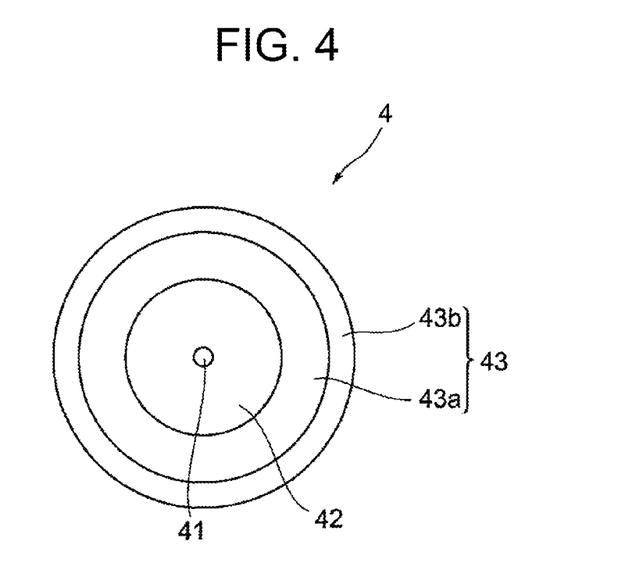
FIG. 4 is a sectional view showing an example of a configuration of the optical fiber used in the battery system.

FIG. 4 is a sectional view showing an example of a configuration of the optical fiber 4. The optical fiber 4 includes a core 41, a clad 42 that covers an outer side of the core 41, and a covering layer 43 that covers an outer side of the clad 42. The optical fiber 4 is formed of, for example, quartz glass or a plastic material.

The core 41 is formed of a material having a refractive index higher than that of the clad 42. When the plastic material is used for the optical fiber 4, for example, fluorine polymer is used for the clad 42. The core 41 is formed of a material having a refractive index higher than that of the fluorine polymer. For example, as the core 41, fully-fluorinated polymer, a methyl polymethacrylate material, polycarbonate, or polystyrene may be used. When the quartz glass is used for the optical fiber 4, both of the core 41 and the clad 42 are formed of the quartz glass. To raise the refractive index, for example, germanium or phosphor is added to the core 41. To lower the refractive index, for example, boron or fluorine is added to the clad 42.

Usually, the covering layer 43 has a two-layer structure including a primary covering layer 43a that covers the outer side of the clad 42 and a secondary covering layer 43b that further covers an outer side of the primary covering layer 43a. The primary covering layer 43a is formed to disperse external force and is formed of resin having an elastic modulus smaller than that of the secondary covering layer 43b. The secondary covering layer 43b is formed to compensate for mechanical strength of the optical fiber 4 and is formed of a material having an elastic modulus larger than that of the primary covering layer 43a.

A type and structure of the optical fiber 4 only has to be appropriately selected according to an environment of use and an application. As an example, a single-mode fiber is used. The single-mode fiber is a fiber in which an oscillation mode for light to be propagated is single. In the single-mode fiber, a diameter of the core 41 is smaller than the diameter of the core in a multi-mode fiber. The diameter of the core 41 is about 8 μm to 12 μm. By using the single-mode fiber, it is possible to increase a change in the transmission properties with respect to the lateral pressure compared with that in the multi-mode fiber.

In one embodiment, for example, the optical fiber 4 with the covering layer 43 formed as thin as possible and a refractive index ratio (Δ%) of the core 41 and the clad 42 set as small as possible is used. This makes it possible to increase the change in the transmission properties with respect to the lateral pressure.

In a portion of the optical fiber 4 exposed from the housing 2a, a covering layer for reinforcement may be further formed on an outer side of the covering layer 43 to prevent a change in the transmission properties of the optical fiber 4 due to application of external force other than a change in the external shape of the lithium ion battery 2. As the covering layer for reinforcement, for example, nylon or polyethylene can be used. Alternatively, the optical fiber 4 may be inserted into a pipe for reinforcement. This makes it possible to reduce detection errors due to the external force other than the change in the external shape of the lithium ion battery 2.

Figure 5:
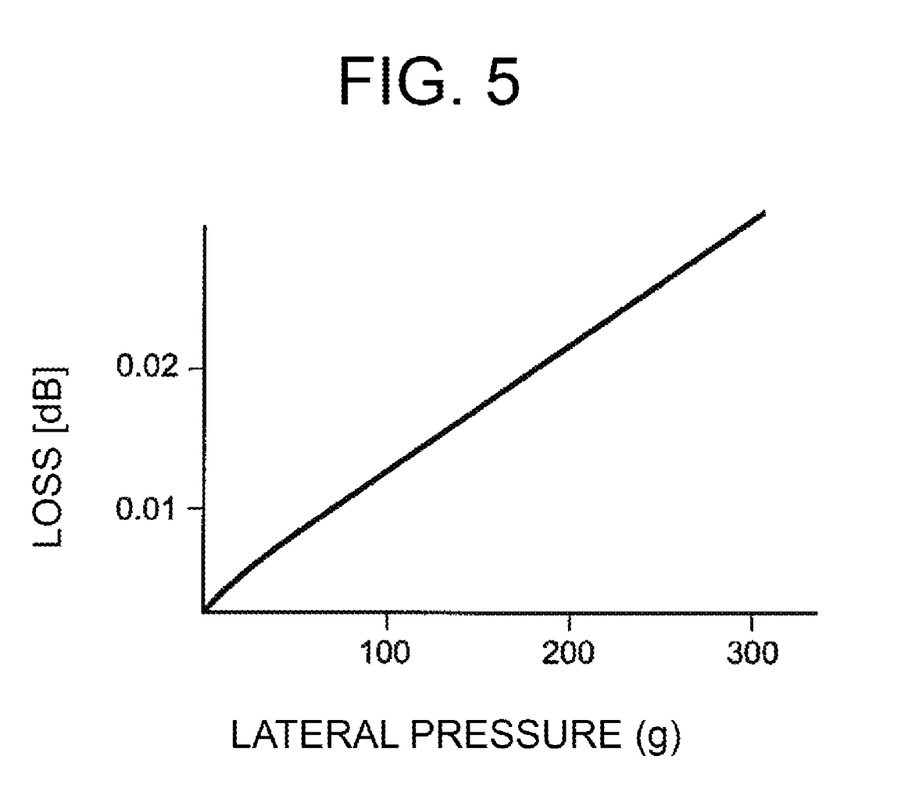
FIG. 5 is a graph showing a relation between the lateral pressure and a loss in the optical fiber.

FIG. 5 is a graph showing an example of a relation between the lateral pressure and a loss in the optical fiber 4. Dimensions of the cylindrical lithium ion battery 2 used in this example include an external diameter of 34.2 mm and a length of 61.5 mm. For the optical fiber 4, a single-mode fiber having a clad diameter of 80 μm, an external diameter of 125 μm, and a refractive index ratio of a core and a clad of 0.35% to 0.38% was used. The single-mode fiber was wound around the lithium ion battery 2 over about 50 mm while being closely attached to or adjacent to or in contact with the lithium ion battery 2 along the external shape thereof. In this case, a minimum bending diameter of the optical fiber 4 was about 5 mm. A laser beam having an irradiation wavelength of 1.55 μm was used. As shown in FIG. 5, it was confirmed that the loss increases in proportion to the lateral pressure acting on the optical fiber 4.

The detector alarm 5 receives a laser beam transmitted via the optical fiber 4 and warns a user of abnormality of the lithium ion battery 2 on the basis of a change in the transmission properties of the optical fiber 4 (an increase in a loss of light). Specifically, the detector alarm 5 may include a detector 6 and an alarm 7.

The detector 6 receives a laser beam transmitted by the optical fiber 4 and detects abnormality of the lithium ion battery 2 on the basis of a change in transmission properties of the laser beam due to the optical fiber 4. The detector 6 includes for example an O/E converter (Optical/Electronic signal converter) including a photodiode that receives a light signal from the optical fiber 4 and converts the light signal into an electric signal and a control circuit that calculates a loss of light due to the optical fiber 4 on the basis of the electric signal from the O/E converter, compares a threshold set in advance with the loss of the light, and controls the alarm 7 on the basis of a result of the comparison. The detector 6 detects abnormality of the lithium ion battery 2 on the basis of, for example, an absolute value of a loss of a laser beam. In this case, the detector 6 compares the loss of the laser beam with the threshold set in advance and, when the loss of the laser beam is larger than the threshold, detects abnormality of the lithium ion battery 2. The threshold is determined by, for example, measuring the relation between the lateral pressure and the loss in the optical fiber 4 shown in FIG. 5 in advance under an environment in which the lithium ion battery 2 is actually used. Alternatively, the detector 6 may detect abnormality of the lithium ion battery 2 on the basis of an amount of a change with time of the loss of the laser beam. This makes it possible to detect a sudden change in the external shape of the lithium ion battery 2 as abnormality.

When abnormality of the lithium ion battery 2 is detected by the detector 6, the alarm 7 warns the user of the abnormality. For example, the alarm 7 displays the abnormality or sounds an alarm to thereby warn the user of the abnormality.

Operation of the battery system 1 according to this embodiment is explained. A laser beam emitted by the light source 3 is transmitted via the optical fiber 4 and received by the detector 6. An amount of received light of the laser beam transmitted via the optical fiber 4 is monitored and a loss of light is measured by the detector 6. When the external shape of the lithium ion battery 2 is changed by, for example, a rise in the pressure in the lithium ion battery 2, a lateral pressure acts on the optical fiber 4. As a result, the transmission properties of the optical fiber 4 are deteriorated. In this case, a loss of the light measured by the detector 6 increases. For example, when the loss of the light reaches a predetermined threshold, a warning (display or sound) is emitted by the alarm 7. When the warning is emitted by the alarm 7, the user only has to stop using the lithium ion battery 2 or use of the lithium ion battery 2 may be automatically reduced or terminated. Thereafter, the lithium ion battery 2 is inspected and reused or discarded. Measures taken by the user after the warning is emitted by the alarm 7 is not specifically limited.

In this embodiment, since the housing 2a that restrains the optical fiber 4 is arranged around the battery and the optical fiber 4, the optical fiber 4 is held between the outer surface portion of the lithium ion battery 2 and the housing 2a. The optical fiber 4 receives pressure from both the outer surface portion of the lithium ion battery 2 and the housing 2a. As a result, it is possible to increase lateral pressure acting on the optical fiber 4 compared with lateral pressure that would act on the optical fiber 4 when the housing 2a is not provided. Therefore, it is possible to further improve sensitivity to a change in an external shape of a battery when the housing 2a is provided.

As explained above, the present disclosure is not limited to the embodiments disclosed herein. Various modifications of the present disclosure are possible without departing from the spirit of the present disclosure. For example, the optical fiber 4 may be wound around an outer surface of a battery itself in a cell unit or a module unit in which a plurality of the cells are connected or an outer surface of a housing in which the battery is housed. For example, in one embodiment, the lithium ion battery 2 may have a square shape or a coin shape. Structure and/or shape of the lithium ion battery 2 is not limited. Embodiments can be applied to secondary batteries, other than the lithium ion battery, including primary batteries such as an alkali dry battery and a nickel dry battery, and fuel batteries.

The battery safety alarm system according to the present disclosure can be used in all secondary batteries including the lithium ion batteries, primary batteries such as an alkali dry battery and a nickel dry battery, and fuel batteries. The battery system according to the present disclosure can be used in an automobile in addition to all electronic apparatuses including a cellular phone and a personal computer.

What is claimed is:

1. A battery system comprising:
a lithium ion battery formed in a cylindrical shape and including an organic electrolytic solution as an electrolyte; a laser beam source that emits a laser beam;
an optical fiber of a single mode that is wound around an outer circumferential portion of the lithium ion battery in a plurality of lines and via which the laser beam emitted from the light source is transmitted;
a housing that houses the lithium ion battery and a region of the optical fiber that is in contact with an outer surface portion of the lithium ion battery and is arranged in contact with the optical fiber, the optical fiber being disposed between the housing and the lithium ion battery, such that when a lateral pressure from the lithium ion battery acts on the optical fiber, the lateral pressure is exerted on a first side of the optical fiber facing the lithium ion battery while a second side of the optical fiber is restrained by the housing;
a detector that receives the laser beam transmitted via the optical fiber and detects abnormality of the lithium ion battery on the basis of a change in transmission properties caused by lateral pressure acting on the optical fiber or a change with time of the loss; and
an alarm that warns, when abnormality of the lithium ion battery is detected by the detector, a user of the abnormality.

2. A battery system comprising:
a lithium ion battery formed in a cylindrical shape and including an organic electrolytic solution as an electrolyte; a laser beam source that emits a laser beam;
an optical fiber of a single mode that is wound around an outer circumferential portion of the lithium ion battery in a plurality of lines and via which the laser beam emitted from the light source is transmitted;
a housing that houses the lithium ion battery and a region of the optical fiber that is in contact with an outer surface portion of the lithium ion battery and is arranged in contact with the optical fiber, the optical fiber being disposed between the housing and the lithium ion battery, such that when a lateral pressure from the lithium ion battery acts on the optical fiber, the lateral pressure is exerted on a first side of the optical fiber facing the lithium ion battery while a second side of the optical fiber is restrained by the housing;
a detector that receives the laser beam transmitted via the optical fiber and detects abnormality of the lithium ion battery on the basis of a change with time of an amount of received light; and
an alarm that warns, when abnormality of the lithium ion battery is detected by the detector, a user of the abnormality.

3. A battery system comprising:
a battery;
a light source that emits light;
an optical fiber of a single mode that is wound around an outer surface portion of the battery and via which the light emitted from the light source is transmitted;
a housing that houses the battery and a region of the optical fiber wound around the outer surface portion of the battery, the optical fiber being disposed between the housing and the battery, such that when a lateral pressure from the battery acts on the optical fiber, the lateral pressure is exerted on a first side of the optical fiber facing the battery while a second side of the optical fiber is restrained by the housing; and
a detector that receives the light transmitted via the optical fiber and detects abnormality of the battery on the basis of a change in transmission properties caused by lateral pressure acting on the optical fiber.

4. The battery system according to claim 3, wherein the housing is arranged in contact with the optical fiber.

5. The battery system according to claim 3, further comprising an alarm that warns, when abnormality of the battery is detected by the detector, a user of the abnormality.

6. The battery system according to claim 3, wherein the battery is a lithium ion battery.

7. The battery system according to claim 6, wherein the lithium ion battery includes an organic electrolytic solution as an electrolyte.

8. The battery system according to claim 3, wherein the light source emits a laser beam.

9. The battery system according to claim 3, wherein the battery has a cylindrical external shape.

10. The battery system according to claim 3, wherein the optical fiber is wound around the outer surface portion of the battery in a plurality of lines.

11. An automobile comprising the battery system according to claim 3.

12. A cellular phone comprising the battery system according to claim 3.

13. A personal computer comprising the battery system according to claim 3.

14. A battery system comprising:
a battery;
a light source that emits light;

an optical fiber of a single mode that is wound around an outer surface portion of the battery and via which the light emitted from the light source is transmitted;

a housing that houses the battery and a region of the optical fiber wound around the outer surface portion of the battery, the optical fiber being disposed between the housing and the battery, such that when a lateral pressure from the battery acts on the optical fiber, the lateral pressure is exerted on a first side of the optical fiber facing the battery while a second side of the optical fiber is restrained by the housing; and a detector that receives the light transmitted via the optical fiber and detects abnormality of the battery on the basis of a change with time of an amount of received light.

15. The battery system according to claim 14, wherein the housing is arranged in contact with the optical fiber.

16. The battery system according to claim 14, further comprising an alarm that warns, when abnormality of the battery is detected by the detector, a user of the abnormality.

17. The battery system according to claim 14, wherein the battery is a lithium ion battery.

18. The battery system according to claim 17, wherein the lithium ion battery includes an organic electrolytic solution as an electrolyte.

19. The battery system according to claim 14, wherein the light source emits a laser beam.

20. The battery system according to claim 14, wherein the battery has a cylindrical external shape.

21. The battery system according to claim 14, wherein the optical fiber is wound around the outer surface portion of the battery in a plurality of lines.

22. An automobile comprising the battery system according to claim 14.

23. A cellular phone comprising the battery system according to claim 14.

24. A personal computer comprising the battery system according to claim 14.

25. A battery safety alarm system comprising:
a light source that emits light;
an optical fiber of a single mode that is wound around an outer surface portion of a battery and via which the light emitted from the light source is transmitted;
a housing that houses the battery and a region of the optical fiber wound around the outer surface portion of the battery, the optical fiber being disposed between the housing and the battery, such that when a lateral pressure from the battery acts on the optical fiber, the lateral pressure is exerted on a first side of the optical fiber facing the battery while a second side of the optical fiber is restrained by the housing; and
a detector alarm that receives the light transmitted via the optical fiber, detects abnormality of the battery on the basis of a change in transmission properties caused by lateral pressure acting on the optical fiber, and warns, when abnormality of the battery is detected, a user of the abnormality.

26. A battery safety alarm system comprising:
a light source that emits light;
an optical fiber of a single mode that is wound around an outer surface portion of a battery and via which the light emitted from the light source is transmitted;
a housing that houses the battery and a region of the optical fiber wound around the outer surface portion of the battery, the optical fiber being disposed between the housing and the battery, such that when a lateral pressure from the battery acts on the optical fiber, the lateral pressure is exerted on a first side of the optical fiber facing the battery while a second side of the optical fiber is restrained by the housing; and
a detector alarm that receives the light transmitted via the optical fiber, detects abnormality of the battery on the basis of a change with time of an amount of received light, and warns, when abnormality of the battery is detected, a user of the abnormality.

* * * * *